United States Patent
Ell

(10) Patent No.: US 10,462,361 B2
(45) Date of Patent: Oct. 29, 2019

(54) SEEKER WITH DYNAMIC RESOLUTION IMAGING

(71) Applicant: Rosemount Aerospace Inc., Burnsville, MN (US)

(72) Inventor: Todd Anthony Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/715,701

(22) Filed: Sep. 26, 2017

(65) Prior Publication Data

US 2019/0098207 A1  Mar. 28, 2019

(51) Int. Cl.
| | |
|---|---|
| *H04N 5/232* | (2006.01) |
| *G06T 3/40* | (2006.01) |
| *F41G 7/22* | (2006.01) |
| *G02B 27/10* | (2006.01) |
| *G02B 13/00* | (2006.01) |
| *G02B 27/12* | (2006.01) |
| *G02B 27/58* | (2006.01) |
| *G02B 27/14* | (2006.01) |

(Continued)

(52) U.S. Cl.
CPC ......... *H04N 5/23232* (2013.01); *F41G 7/226* (2013.01); *F41G 7/2293* (2013.01); *G02B 13/0085* (2013.01); *G02B 27/1066* (2013.01); *G02B 27/126* (2013.01); *G02B 27/144* (2013.01); *G02B 27/146* (2013.01); *G02B 27/58* (2013.01); *G06T 3/4053* (2013.01); *G06T 3/4069* (2013.01); *H04N 5/2254* (2013.01); *H04N 5/3415* (2013.01)

(58) Field of Classification Search
CPC .... H04N 5/23232; H04N 5/347; G02B 27/58; G02B 13/0085; G02B 27/126; G02B 27/1066; G06T 3/4069; G06T 3/4053; F42B 15/00; F41G 7/2293; F41G 7/226
USPC ....................................... 348/218.1
See application file for complete search history.

(56) References Cited

U.S. PATENT DOCUMENTS

| | | | |
|---|---|---|---|
| 6,958,862 B1 * | 10/2005 | Joseph | G02B 27/1013 257/294 |
| 7,003,177 B1 | 2/2006 | Mendlovic et al. | |

(Continued)

FOREIGN PATENT DOCUMENTS

JP    2005318548 A    11/2005

OTHER PUBLICATIONS

Partial European Search Report for EP Application No. 181963133, dated Feb. 25, 2019, pp. 14.

(Continued)

*Primary Examiner* — Lin Ye
*Assistant Examiner* — Chan T Nguyen
(74) *Attorney, Agent, or Firm* — Kinney & Lange, P.A.

(57) ABSTRACT

A seeker imaging system and method includes at least one imager, a plurality of optical elements, and control electronics. The at least one imager is configured to output image frame data. The plurality of optical elements are configured to receive light and direct the light to the at least one imager. The control electronics are configured to receive the image frame data from the at least one imager. The control electronics is configured to obtain a plurality of initial images from each frame of the image frame data, and wherein the control electronics is configured to generate a single output image based upon the plurality of initial images.

20 Claims, 8 Drawing Sheets

(51) Int. Cl.
 *H04N 5/225* (2006.01)
 *H04N 5/341* (2011.01)

(56) References Cited

U.S. PATENT DOCUMENTS

| | | |
|---|---|---|
| 7,477,802 B2 | 1/2009 | Milanfar et al. |
| 8,471,905 B2 | 6/2013 | Kennedy et al. |
| 8,718,403 B2 | 5/2014 | Potter et al. |
| 8,953,012 B2 | 2/2015 | Williams et al. |
| 9,361,662 B2 | 6/2016 | Lelescu et al. |
| 2009/0030630 A1 | 1/2009 | Eitan et al. |
| 2015/0122411 A1 | 5/2015 | Rodda et al. |
| 2015/0268345 A1* | 9/2015 | Ell .......................... F41G 7/008 356/5.01 |
| 2016/0142645 A1* | 5/2016 | Shionoya ........... H04N 5/35554 348/218.1 |
| 2016/0216502 A1 | 7/2016 | Kalkbrenner et al. |
| 2017/0214858 A1 | 7/2017 | Keller et al. |

OTHER PUBLICATIONS

Extended European Search Report for EP Application No. 18196313.3, dated May 28, 2019, pp. 12.

\* cited by examiner

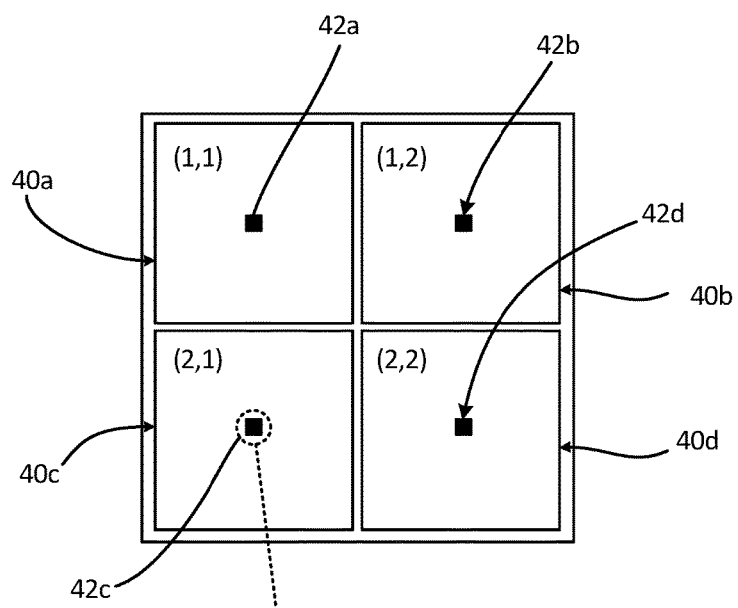
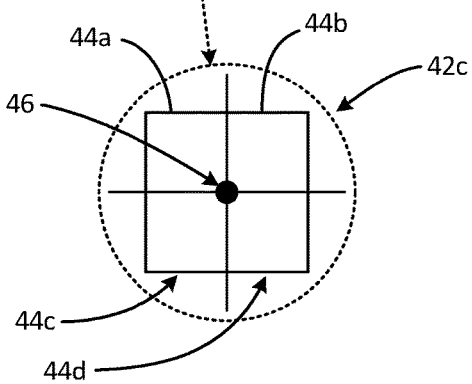
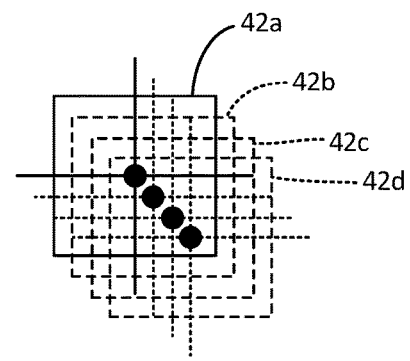
Fig. 3A
Fig. 3B
Fig. 3C

SEEKER WITH DYNAMIC RESOLUTION IMAGING

BACKGROUND

The present invention relates generally to guided munitions, and in particular to dynamic resolution imaging for terminal imaging seekers.

Modern precision guided munitions require the use of terminal imaging seekers to improve weapon effectiveness. Seekers often reside in the nosecone of the munition and thus, weight and volume are important considerations. Seekers which use autonomous target acquisition and recognition algorithms must provide high resolution images at long ranges, which requires the use of a high pixel count focal plane array (FPA) in order to discern fine details regarding potential targets and distinguish those fine details from background clutter.

A desired resolution for a seeker is referred to as the number of pixels-on-target. To increase the pixels-on-target, the field-of-view may be narrowed, but this reduces the search area of the seeker, which risks missing the target completely. A larger FPA generally requires larger optics, which utilizes more volume within the munition. Additionally, with a larger FPA, as the munition approaches the target, the number of pixels-on-target becomes unnecessarily large, which slows the automatic tracking algorithms for the target.

During the final stages of engagement, it is desirable to increase the target tracking update rate (i.e., frames per second). The update rate, however, is limited by the high pixel count coming into the target tracking algorithm. To increase the update rate, adjacent pixels may be 'binned' to reduce the total pixel count. However, this method does not reduce the packaging size of the seeker, as it does not reduce the size of the FPA. It is desirable to reduce the volume and weight of the seeker without narrowing the field-of-view and while retaining the desired pixels-on-target.

SUMMARY

A seeker imaging system includes at least one imager, a plurality of optical elements, and control electronics. The at least one imager is configured to output image frame data. The plurality of optical elements are configured to receive light and direct the light to the at least one imager. The control electronics are configured to receive the image frame data from the at least one imager. The control electronics is configured to obtain a plurality of initial images from each frame of the image frame data, and wherein the control electronics is configured to generate a single output image based upon the plurality of initial images.

A method of generating a single output image for a seeker includes receiving light by a plurality of optical elements; directing, by the plurality of optical elements, the light to at least one imager; outputting, by the at least one imager, image frame data based upon the received light; receiving, by control electronics, the image frame data from the at least one imager; obtaining, by the control electronics, a plurality of initial images from each frame of the image frame data; and generating, by the control electronics, a single output image based upon the plurality of initial images.

BRIEF DESCRIPTION OF THE DRAWINGS

FIG. 3A-3C are diagrams illustrating a set of images captured utilizing the lens stacks and imager of FIG. 2.

DETAILED DESCRIPTION

A seeker is disclosed herein that obtains multiple similar low resolution images and utilizes a super resolution algorithm to generate a high resolution image from the low resolution images. Light is received by the seeker and directed to one or more imagers by multiple sets of optical elements. The optical elements direct the light to the imagers to capture multiple, slightly offset low resolution images from a single image frame. The low resolution images are slightly shifted relative to one another such that super resolution algorithms may be utilized to generate a high resolution image from the multiple low resolution images. Processing and control electronics onboard the seeker may obtain the low resolution images and generate a new, single image, at a resolution selected based upon an operating mode of the seeker and/or a distance of the seeker from a target. By utilizing a super resolution algorithm, the size and weight of the optical elements within the seeker can be greatly reduced.

Figure 1:
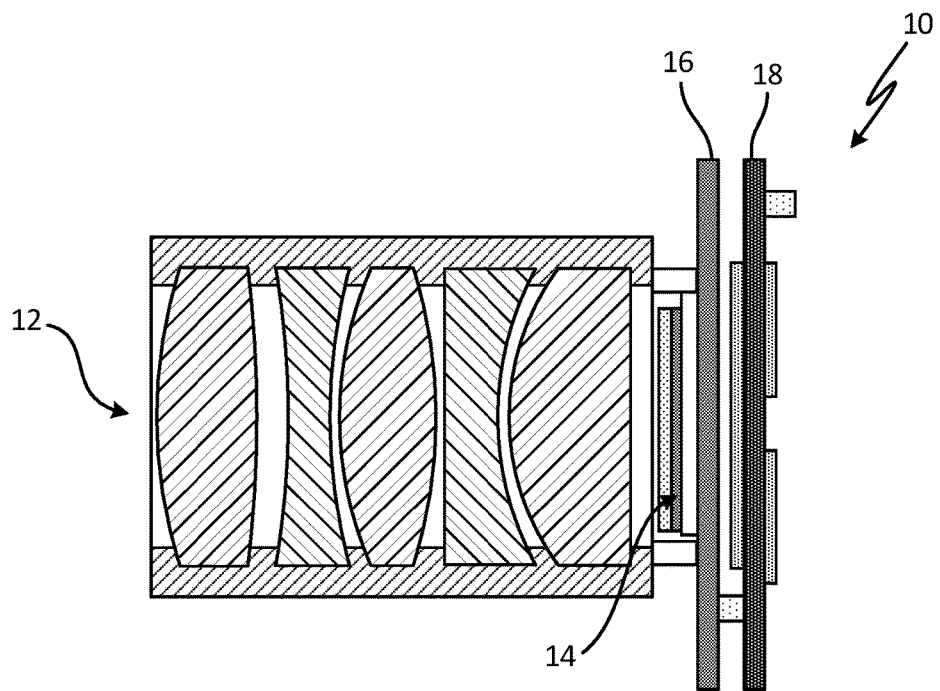
FIG. 1 is a diagram illustrating a prior art single lens seeker.

FIG. 1 is a diagram illustrating prior art seeker 10 having a single lens stack 12. Seeker 10 includes lens stack 12, photo diode array 14, imager 16, and processing electronics 18. Light is received and focused by lens stack 12 onto photo diode array 14. The output of imager 16 is obtained and processed by control electronics 18 to obtain a single image. The obtained image is at the highest resolution capable for seeker 10. Seeker 10 may be implemented within a munition, for example, that performs autonomous target acquisition and recognition.

Figure 2:
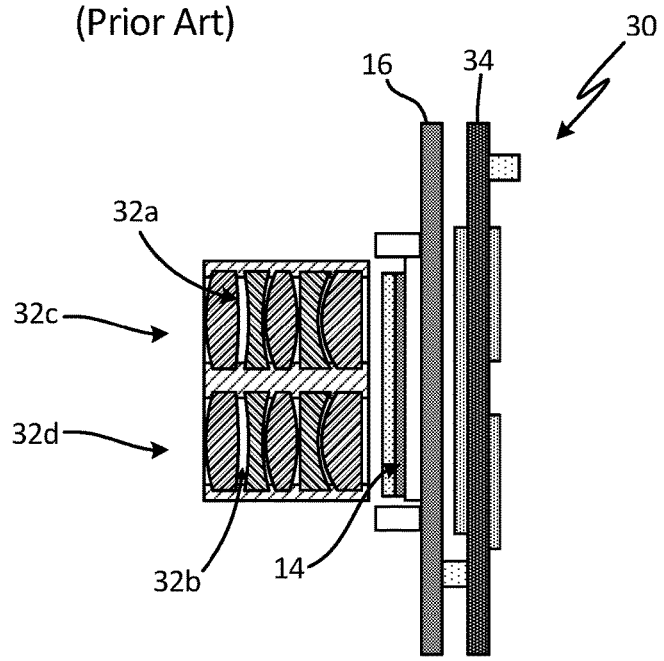
FIG. 2 is a diagram illustrating a seeker having multiple lens stacks and a single imager.

FIG. 2 is a diagram illustrating seeker 30 having multiple lens stacks 32a-32d. Seeker 30 includes lens stacks 32a-32d, photo-diode array 14, imager 16, and control electronics 34. Lens stacks 32a-32d may be configured in a 2×2 array to direct light to photo-diode array 14. In the embodiment illustrated in FIG. 2, lens stacks 32c and 32d (not visible in FIG. 2) reside directly behind lens stacks 32a and 32b. Light is received by seeker 30 and directed to photo diode array 14 by each lens stack 32a-32d such that four similar images are captured by imager 16 for each frame. Lens stacks 32a-32d may be oriented such that the four similar images are slightly offset from one another.

Control electronics 34 obtains output image frames from imager 16. Each image frame includes light focused onto photo diode array 14 by each lens stack 32a-32d. Knowing which quadrant receives light from each of the respective lens stacks 32a-32d, control electronics 34 may obtain four low resolution images from a single frame. The four low resolution images may be similar images that are each slightly offset from one another due to the different optical axes of the four lens stacks 32a-32d, for example.

By using a 2×2 array of lenses 32a-32d, the length of the optics required for seeker 30 may be reduced by half of that of seeker 10, which greatly reduces the volume of the optical elements for seeker 30. While illustrated as a 2×2 array of lenses, any number of lenses may be implemented to obtain any number of low resolution images. For example, a 4×4 array of lenses may be utilized to obtain 16 low resolution images. However, as the number of low resolution images increases, the amount of processing power needed to perform the super resolution algorithm also increases.

FIG. 3A is a diagram illustrating a set of images 40a-40d captured utilizing respective lens stacks 32a-32d of FIG. 2. FIG. 3B is a diagram illustrating pixels 42c of image 40c and a bore site 46. FIG. 3C is a diagram illustrating an offset between pixel sets 42a-42d. FIG. 3A illustrates a single frame provided to control electronics 34 from imager 16 for seeker 30. Image 40a is generated by light from lens stack 32a, image 40b is generated by light from lens stack 32b, image 40c is generated by light from lens stack 32c, and image 40d is generated by light from lens stack 32d. Each image 40a-40d includes many pixels, which include respective pixel sets 42a-42d around the bore site of each low resolution image 40a-40d. As seen in FIG. 3A, each image 40a-40d has a resolution one quarter of the resolution of an output frame of imager 16. Thus, images 40a-40d have resolutions one quarter that of raw images captured by prior art seeker 10 (FIG. 1). For example, if the FPA has a resolution of 512×512 pixels, each low resolution image 40a-40d will have a resolution of 256×256 pixels.

FIG. 3B is a diagram illustrating pixel set 42c of FIG. 3A. Pixel set 42c includes pixels 44a-44d around bore site 46. FIG. 3C is a diagram illustrating pixel sets 42a-42d relative to one another. As seen in FIG. 3C, the bore site of each pixel set 42a-42d is offset from the bore sites of any of the other pixel sets 42a-42d by a sub-pixel amount (i.e., the amount of offset is less than one full pixel between any of the images). Because the offset is less than a full pixel, each respective pixel 44a of pixel sets 42a-42d includes information that may be utilized by a super resolution algorithm to generate a higher resolution image.

Super resolution algorithms are utilized to generate higher resolution images from similar, multiple, low resolution images. Sub-pixel information from each image may be utilized to generate the higher resolution image. For example, if four similar images each have a resolution of 256×256 pixels, and are each offset from one another by less than a full pixel, each related pixel can be utilized to generate 4 pixels of data for a higher resolution image. Given the four 256×256 pixel images, an 1024×1024 pixel image may be generated using super resolution. Thus, by using super resolution, the size of the optical elements of the seeker may be reduced, while achieving an image with a resolution greater than that of the FPA. Any suitable super resolution method may be utilized to generate a high resolution image from multiple low resolution images 40a-40d.

Figure 4:
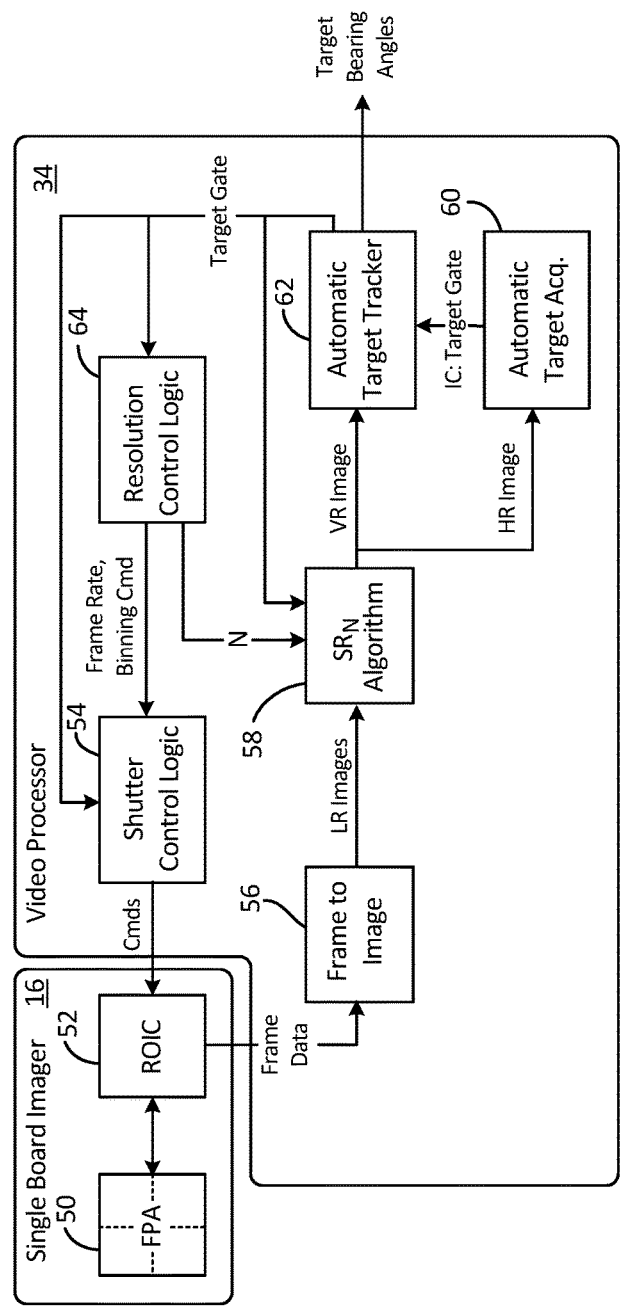
FIG. 4 is a data and control flow block diagram illustrating an algorithm implemented on an embodiment of processing electronics of a seeker.

FIG. 4 is a data and control flow block diagram illustrating an algorithm implemented by control electronics 34 of a munition that includes seeker 30. The algorithm may reside in software and/or firmware implemented on control electronics 34. The data and control flow block diagram of FIG. 4 also illustrates how data may be obtained from imager 16. Imager 16 includes focal plane array (FPA) 50 and readout integrated circuit (ROIC) 52. Control electronics 34 includes shutter control logic 54, frame-to-image block 56, super resolution algorithm ($SR_N$) block 58, automatic target acquisition block 60, automatic target tracker block 62, and resolution control logic block 64.

FPA 50 is a sensor that includes a two-dimensional detector pixel matrix positioned in the focal plane of the optical elements (e.g., lens stacks 32a-32d) of seeker 30. ROIC 52 is an integrated circuit used to read the photocurrent from each pixel of FPA 50 and transfer the resultant signal onto output taps for readout by control electronics 34. The ROIC may also perform binning of adjacent pixels of FPA 50 when seeker 30 desires a low resolution image, for example (as described with respect to FIGS. 5A and 5B).

Control electronics 34 is configured to receive image frames from imager 16 and perform target acquisition and tracking based at least in part upon the image frames. Shutter control logic 54 controls the frame rate, binning, and exposure times of ROIC 52. Frame-to-image block 56 receives the frame data from ROIC 52 and splits each frame into low resolution images 40a-40d. Frame-to-image block 56 may split the frame into images by knowing which pixels represent light directed to FPA 50 by which lens stack 32a-32d, for example. The low resolution images 40a-40d are provided to $SR_N$ block 58.

$SR_N$ block 58, if desired, enhances the resolution of the low resolution images 40a-40d as described below with reference to FIGS. 5A and 5B. If a target has not yet been acquired, automatic target acquisition block 60 receives the single image at the desired resolution from $SR_N$ block 58 and processes the image to identify the location of a desired target in the field of view of seeker 30. If a target is recognized, target acquisition block 60 may determine a bounding box or target gate, and pass the target gate to automatic target tracker block 62 as an initial target gate for subsequent images from $SR_N$ block 58.

Once a target is acquired, automatic target tracker block 62 may assume control and process subsequent images from $SR_N$ block 58. Automatic target tracker block 62 maintains the target gate on the desired target for subsequent images. This includes changes in the gate location as seeker 30 rotates, causing translations and rotations of the gate within the images. Automatic target tracker block 62 outputs target bearing angles to the guidance system of the munition that includes seeker 30. The updated target gate is also output by automatic target tracker block 62 for resolution control logic block 64 and $SR_N$ block 58.

Resolution control logic block 64 analyzes the number of pixels-on-target, and determines, with regard to the target being tracked, if more pixels than necessary are being captured and/or super-resolved. If more pixels than necessary are being captured and/or super resolved, then the resolution of the image from $SR_N$ block 58 can be reduced.

Figure 5A:
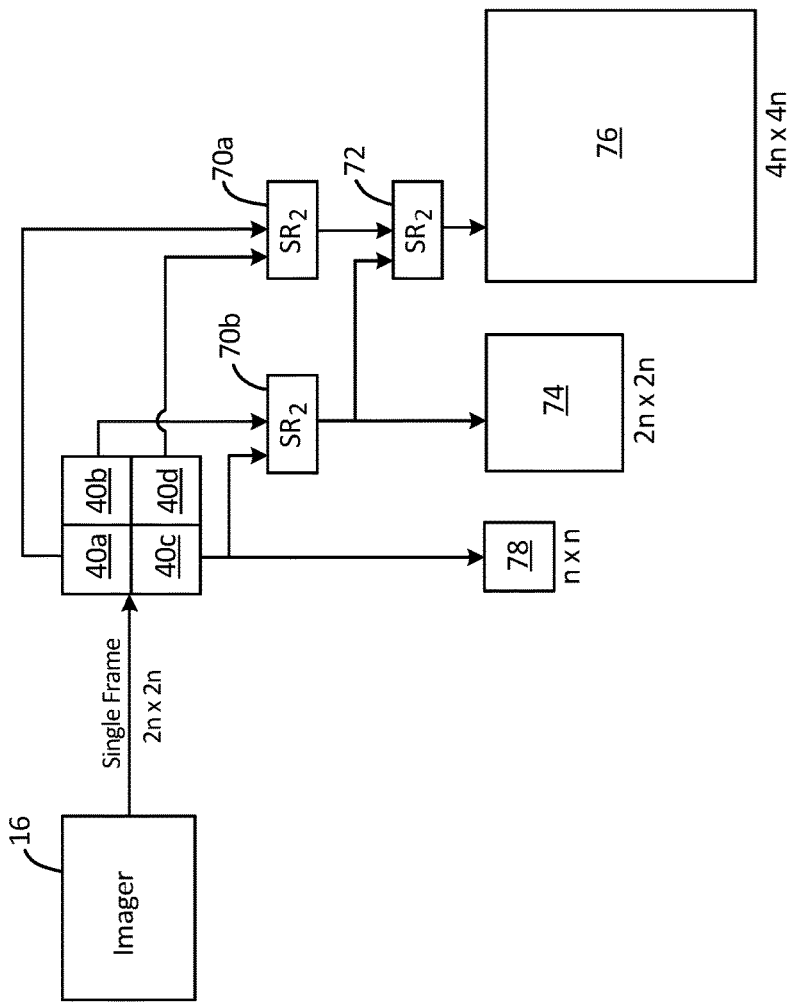
FIGS. 5A and 5B are flow diagrams illustrating methods of obtaining images of varying resolution from multiple low resolution images using a super resolution algorithm.
Figure 5B:
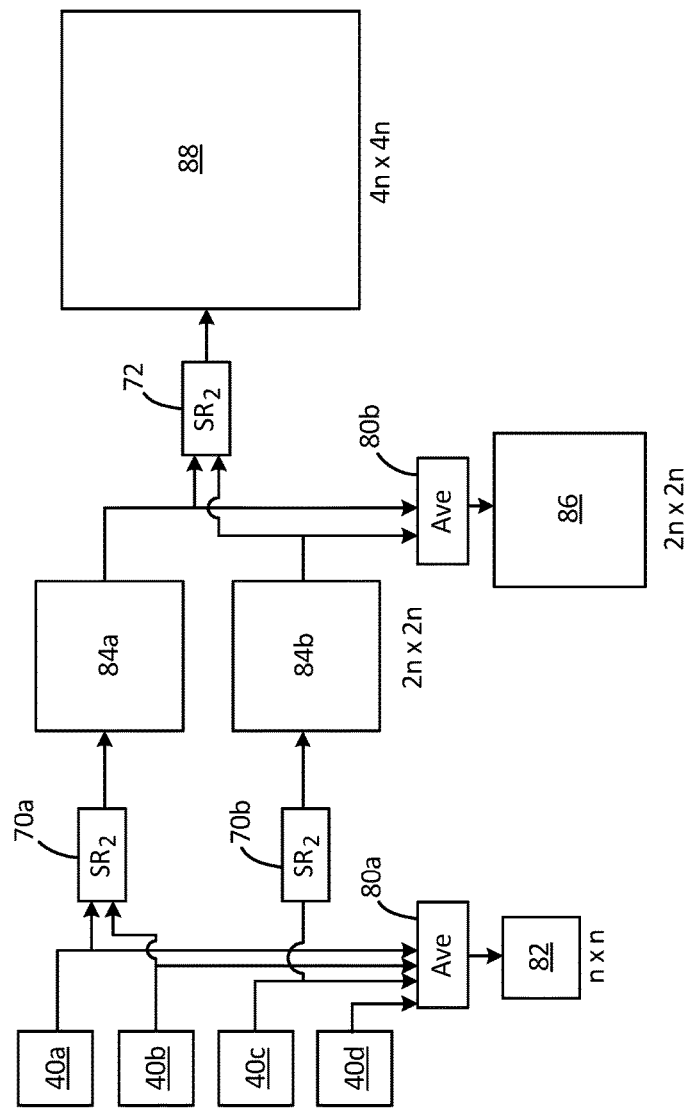

FIGS. 5A and 5B are flow diagrams illustrating methods of obtaining single, controlled resolution images from low resolution images 40a-40d using super resolution. The embodiments described in FIGS. 5A and 5B may be executed by $SR_N$ block 58 of FIG. 4, for example. Two images 40a and 40d are provided to a first SR algorithm block 70a and the other two images 40a and 40d are provided to a second SR algorithm block 70b. Super resolution algorithm blocks 70a and 70b execute a super resolution algorithm on two images to generate a higher resolution image. For example, if low resolution images 40a-40d have a resolution of n×n, the output of super resolution algorithm blocks 70a and 70b are images with a resolution of 2n×2n. SR algorithm blocks 70a and 70b may execute any suitable super resolution algorithm capable of generating a higher resolution output from lower resolution inputs.

If resolution control logic block 64 indicates that a 2n×2n image is desired, then the output of either SR algorithm block 70a or 70b may be provided as output image 74 of $SR_N$ block 58. Each output of SR algorithm blocks 70a and 70b may also be provided to SR algorithm block 72. SR algorithm block 72 may operate in a substantially similar manner to SR algorithm blocks 70a and 70b. Because the two images input to SR algorithm block 72 each have a resolution of 2n×2n, the output of SR algorithm block 72 may be an image 76 with a resolution of 4n×4n. If resolution control logic block 64 indicates that a 4n×4n image is desired, image 76 may be provided as output of $SR_N$ block 58.

If resolution control logic block 64 indicates that an n×n image is desired, then any of images 40a-40d may be provided directly as output image 78. Additionally, when a target is in close range, for example, resolution control logic block 64 may indicate that an image of less than n×n resolution is desired. In this case, pixel binning may be implemented to obtain, for example, ½n×½n, ¼n×¼n, or smaller images. Pixel binning includes "combining" adjacent pixels to form a single output pixel. For example, for the embodiment shown in FIG. 3B, pixels 44a-44d may be combined into a single pixel. Thus, if image 42c has a resolution of 256×256 pixels, pixel binning may be utilized to obtain an output image of 64×64 pixels. Pixel binning may be implemented, for example, in hardware by ROIC 52, or in software by $SR_N$ block 58.

FIG. 5B illustrates an embodiment that utilizes pixel averaging to obtain higher quality, intermediate resolution output images. Like the embodiment of FIG. 5A, images 40a-40d are provided to SR algorithm blocks 70a and 70b. However, images 40a-40d are also provided to averaging block 80a. Averaging block 80a is configured to average the values of the respective pixels of images 70a-70d to arrive at a single average pixel value for each of the respective four pixels of images 70a-70d. This helps to eliminate noise and provide a higher quality n×n output image 82 than any of the original images 40a-40d. This does not increase the complexity of the image capture hardware since the four images 40a-40d are captured each frame regardless of the desired output resolution. Additionally, focal plane arrays may have dead pixels. Averaging block 80a may be configured to know of the dead pixels of FPA 50 and not include those pixels when performing the averaging function.

The output of SR algorithm blocks 70a and 70b, which are 2n×2n images, are provided both to SR algorithm block 72 and averaging block 80b. Like averaging block 80a, averaging block 80b is configured to average the two respective pixels of the 2n×2n images and output a single averaged pixel for a 2n×2n output image 86. This reduces noise and provides a greater quality 2n×2n image than either of the individual outputs of algorithm blocks 70a and 70b. The output of SR algorithm block 72 outputs a 4n×4n image 88 based upon the two 2n×2n image outputs from respective SR algorithm blocks 70a and 70b. As described above with reference to FIG. 5A, pixel binning may be employed to achieve resolutions less than n×n if desired. For example, pixel binning may be utilized in hardware such that images 40a-40d arrive at ¼n×¼n resolution. In this scenario, the output of averaging block 80a would be a ¼n×¼n image.

Figure 6A:
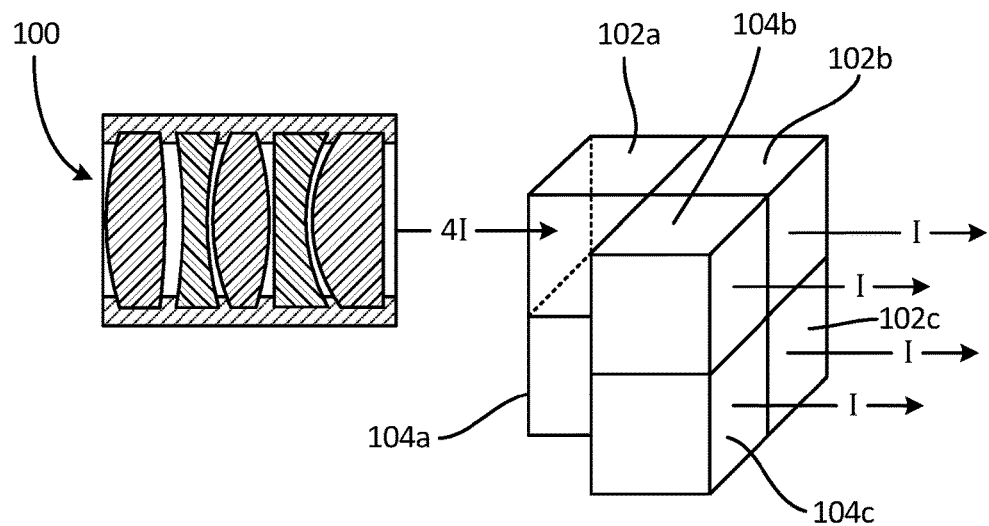
FIGS. 6A and 6B are diagrams illustrating another embodiment of optical elements for a seeker.
Figure 6B:
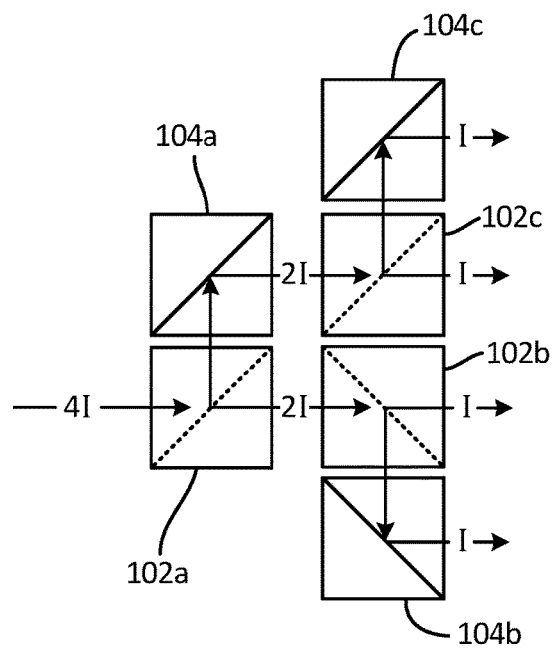

FIGS. 6A and 6B are diagrams illustrating another embodiment of optical elements for seeker 30. Rather than using a 2×2 (or n×n) matrix of lens stacks 32a-32d (FIG. 2), a single lens stack 100, prisms 102a-102c, and mirrors 104a-104c may be implemented to direct light to imager 16 to capture multiple low resolution images 40a-40d. Light enters lens stack 100 and is focused into prism 102a. Prism 102a may be a beam splitter or any other device capable of reflecting a portion of light while also passing through a portion of light. Prism 102a splits the received and focused light and sends the split light to both mirror 104a and prism 102b. Light is reflected by mirror 104a to prism 102c. Prism 102b splits light to provide a first light output to imager 16 (FIG. 2) and a second light output to mirror 104b. Mirror 104b reflects the light to provide a second light output to imager 16. Prism 102c splits light to provide a third light output to imager 16 and a light output to mirror 104c. Mirror 104c reflects the light to provide a fourth light output to imager 16. This way, the four light outputs are provided to imager 16 to generate images 40a-40d. Prisms 102b and 102c, and mirrors 104b and 104c may be oriented such that the four light outputs generate similar, but slightly offset images 40a-40d. While illustrated as providing 4 light outputs to imager 16, any number of prisms and mirrors may be implemented to achieve multiple low resolution images.

Figure 7:
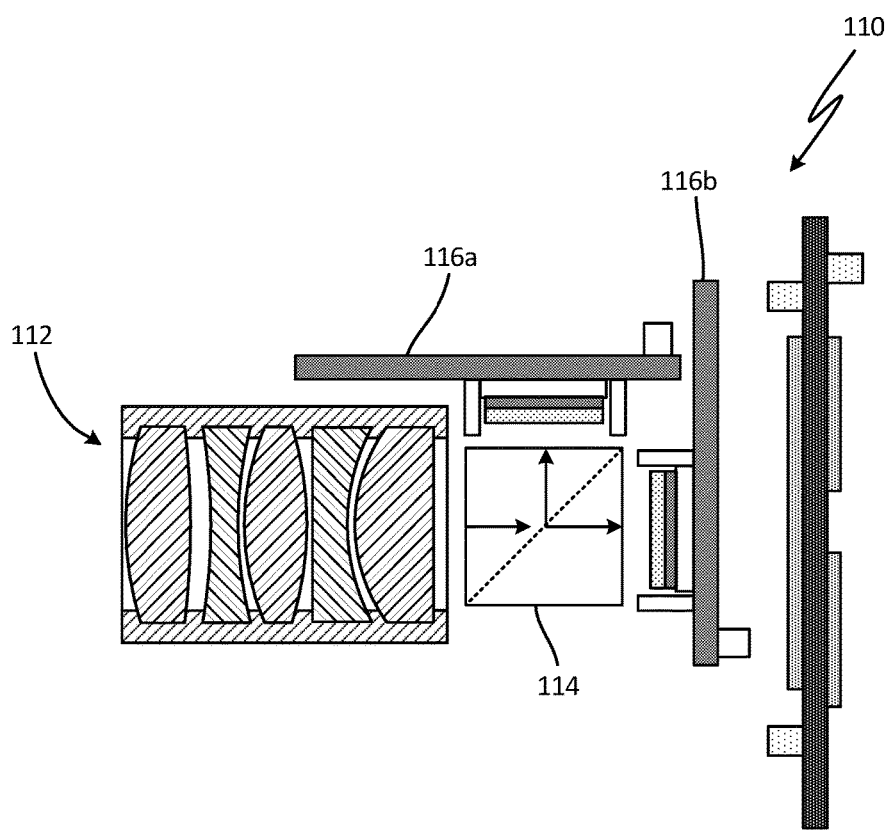
FIG. 7 is a diagram illustrating a seeker using a single lens stack, a single prism, and two imagers.

FIG. 7 is a diagram illustrating a seeker 110 using a single lens stack 112, single prism 114, and two imagers 116a and 116b. Light is received by single lens stack 112 and focused into prism 114. Prism 114 splits the light and provides the split light to imagers 116a and 116b. Prism 114 may be a beam splitter or any other device capable of reflecting a portion of light, while allowing the remaining light to pass through.

Prism 114 is configured to direct first light to imager 116a at a first orientation and second light to imager 116b at a second orientation. The orientations are such that the two images are offset from one another by a sub-pixel amount so that a super resolution algorithm may be performed on the two images to obtain a higher resolution image. While illustrated as two imagers and a single prism, any number of imagers and/or prisms may be utilized to obtain any number of low resolution images.

Figure 8:
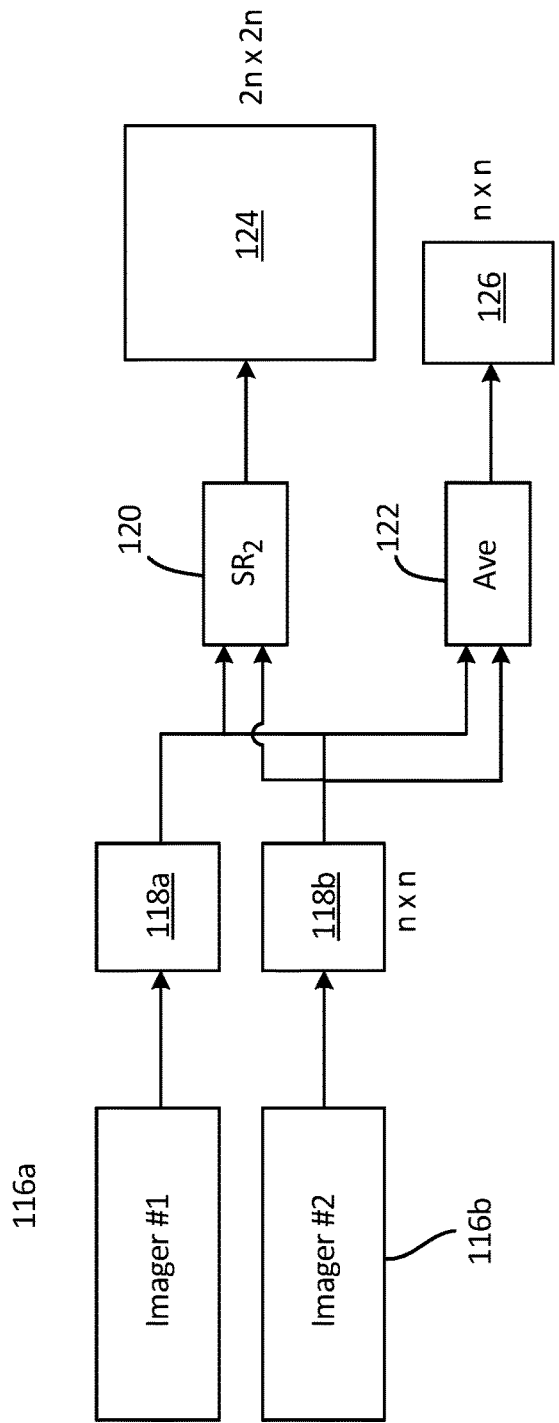
FIG. 8 is a flow diagram illustrating a method of obtaining single images using a super resolution algorithm for seeker.

FIG. 8 is a flow diagram illustrating a method of obtaining single images at a desired resolution using a super resolution algorithm for seeker 110. For example, seeker 110 may include processing electronics similar to those described in FIG. 4 for seeker 30. The method illustrated in figure FIG. 8 may be utilized to implement an $SR_N$ block (similar to $SR_N$ block 58 of FIG. 4) for seeker 110. Each imager 116a and 116b provides an n×n image output 118a and 118b. The n×n images 118a and 118b are provided to SR algorithm block 120 and averaging block 122. SR algorithm block 120 may operate in a substantially similar manner to SR algorithm block 72 of FIGS. 5A and 5B and averaging block 122 may operate in a substantially similar manner to averaging block 80a or 80b of FIG. 5B. SR algorithm block 120 provides a 2n×2n image 124 as output and averaging block 122 provides an n×n image 126 as output. Pixel binning effects may also be implemented in software or hardware to obtain images with a resolution less than n×n.

Discussion of Possible Embodiments

The following are non-exclusive descriptions of possible embodiments of the present invention.

A seeker imaging system includes at least one imager, a plurality of optical elements, and control electronics. The at least one imager is configured to output image frame data. The plurality of optical elements are configured to receive light and direct the light to the at least one imager. The control electronics are configured to receive the image frame data from the at least one imager. The control electronics is configured to obtain a plurality of initial images from each frame of the image frame data, and wherein the control electronics is configured to generate a single output image based upon the plurality of initial images.

The system of the preceding paragraph can optionally include, additionally and/or alternatively, any one or more of the following features, configurations and/or additional components:

A further embodiment of the foregoing system, wherein the plurality of optical elements comprises a plurality of lens stacks, and wherein the at least one imager comprises a focal plane array.

A further embodiment of any of the foregoing systems, wherein the plurality of lens stacks includes a first lens stack configured to direct the light to a first quadrant of the focal plane array; a second lens stack configured to direct the light to a second quadrant of the focal plane array; a third lens stack configured to direct the light to a third quadrant of the focal plane array; and a fourth lens stack configured to direct the light to a fourth quadrant of the focal plane array.

A further embodiment of any of the foregoing systems, wherein the plurality of initial images includes a first initial image comprising the output of the first quadrant of the focal plane array, a second image comprising the output of the second quadrant of the focal plane array, a third image comprising the output of the third quadrant of the focal plane array, and a fourth image comprising the output of the fourth quadrant of the focal plane array.

A further embodiment of any of the foregoing systems, wherein the plurality of optics includes a single lens stack, a plurality of prisms and a plurality of mirrors.

A further embodiment of any of the foregoing systems, wherein the at least one imager comprises a focal plane array, and wherein the plurality of prisms and the plurality of mirrors are configured to split and direct the light onto the focal plane array such that the output of the focal plane array includes the plurality of initial images.

A further embodiment of any of the foregoing systems, wherein the plurality of optics includes a single lens stack and a single prism, and wherein the at least one imager comprises first and second imagers, and wherein the single prism directs the light from the single lens stack to the first imager to obtain a first one of the plurality of initial images and wherein the single prism directs the light to the second imager to obtain a second one of the plurality of initial images.

A further embodiment of any of the foregoing systems, wherein the plurality of initial images are each at a first resolution, and wherein the plurality of initial images are each offset from one another by a sub-pixel amount.

A further embodiment of any of the foregoing systems, wherein the control electronics is configured to execute a super resolution algorithm on the plurality of initial images to generate the single output image having a second resolution greater than the first resolution.

A further embodiment of any of the foregoing systems, wherein the control electronics is further configured to perform pixel binning to generate the single output image have a third resolution less than the first resolution.

A method of generating a single output image for a seeker includes receiving light by a plurality of optical elements; directing, by the plurality of optical elements, the light to at least one imager; outputting, by the at least one imager, image frame data based upon the received light; receiving, by control electronics, the image frame data from the at least one imager; obtaining, by the control electronics, a plurality of initial images from each frame of the image frame data; and generating, by the control electronics, a single output image based upon the plurality of initial images.

The method of the preceding paragraph can optionally include, additionally and/or alternatively, any one or more of the following features, configurations and/or additional components:

A further embodiment of the foregoing method, wherein the plurality of optical elements comprises a plurality of lens stacks, and wherein the at least one imager comprises a focal plane array.

A further embodiment of any of the foregoing methods, wherein directing, by the plurality of optical elements, the light to at least one imager includes directing, by a first lens stack, the light to a first quadrant of the focal plane array; directing, by a second lens stack, the light to a second quadrant of the focal plane array; directing, by a third lens stack, the light to a third quadrant of the focal plane array; and directing, by a fourth lens stack, the light to a fourth quadrant of the focal plane array.

A further embodiment of any of the foregoing methods, wherein obtaining, by the control electronics, the plurality of initial images from each frame of the image frame data includes obtaining a first initial image from the image frame data corresponding to the first quadrant of the focal plane array; obtaining a second initial image from the image frame data corresponding to the second quadrant of the focal plane array; obtaining a third initial image from the image frame data corresponding to the third quadrant of the focal plane array; and obtaining a fourth initial image from the image frame data corresponding to the fourth quadrant of the focal plane array.

A further embodiment of any of the foregoing methods, wherein the plurality of optics includes a single lens stack, a plurality of prisms and a plurality of mirrors, and wherein the at least one imager comprises a focal plane array.

A further embodiment of any of the foregoing methods, wherein directing, by the plurality of optical elements, the light to at least one imager includes splitting, by the plurality of prisms, the light from the single lens stack; and directing, by the plurality of prisms and the plurality of mirrors, the light to the focal plane array, wherein the light is split to form the plurality of initial images.

A further embodiment of any of the foregoing methods, wherein the plurality of optics includes a single lens stack and a single prism, and wherein the at least one imager comprises first and second imagers, and wherein directing, by the plurality of optical elements, the light to at least one imager includes directing, by the single prism, the light from the single set of lenses to the first imager to obtain a first one of the plurality of initial images; and directing, by the single prism, the light to the second imager to obtain a second one of the plurality of initial images.

A further embodiment of any of the foregoing methods, wherein the plurality of initial images are each at a first resolution, and wherein directing, by the plurality of optical elements, the light to the at least one imager includes directing the light such that the plurality of initial images are each offset from one another by a sub-pixel amount.

A further embodiment of any of the foregoing methods, wherein generating, by the control electronics, the single output image includes executing, by the control electronics, a super resolution algorithm on the plurality of initial images to generate the single output image having a second resolution greater than the first resolution.

A further embodiment of any of the foregoing methods, wherein generating, by the control electronics, the single output image further includes performing pixel binning to generate the single output image having a third resolution less than the first resolution.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seeker imaging system comprising:
   at least one imager configured to output image frame data;
   a plurality of optical elements configured to receive light and direct the light to the at least one imager; and
   control electronics configured to receive the image frame data from the at least one imager, wherein the control electronics is configured to obtain a plurality of initial images from each frame of the image frame data, and wherein the control electronics is configured to generate a single output image based upon the plurality of initial images, wherein
   if a target has not yet been acquired, an automatic target acquisition block of the control electronics receives the single output image at a desired resolution of the super resolution algorithm and processes the single output image to identify a location of a desired target in a field of view of the seeker and, if a target is recognized, the target acquisition block determines a target gate and passes the target gate to an automatic target tracker block as an initial target gate for subsequent images from the super resolution algorithm.

2. The seeker imaging system of claim 1, wherein the plurality of optical elements comprises a plurality of lens stacks, and wherein the at least one imager comprises a focal plane array.

3. The seeker imaging system of claim 2, wherein the plurality of lens stacks comprises:
   a first lens stack configured to direct the light to a first quadrant of the focal plane array;
   a second lens stack configured to direct the light to a second quadrant of the focal plane array;
   a third lens stack configured to direct the light to a third quadrant of the focal plane array; and
   a fourth lens stack configured to direct the light to a fourth quadrant of the focal plane array.

4. The seeker imaging system of claim 3, wherein the plurality of initial images includes a first initial image comprising the output of the first quadrant of the focal plane array, a second image comprising the output of the second quadrant of the focal plane array, a third image comprising the output of the third quadrant of the focal plane array, and a fourth image comprising the output of the fourth quadrant of the focal plane array.

5. The seeker imaging system of claim 1, wherein the plurality of optics includes a single lens stack, a plurality of prisms and a plurality of mirrors.

6. The seeker imaging system of claim 5, wherein the at least one imager comprises a focal plane array, and wherein the plurality of prisms and the plurality of mirrors are configured to split and direct the light onto the focal plane array such that the output of the focal plane array includes the plurality of initial images.

7. The seeker imaging system of claim 1, wherein the plurality of optics includes a single lens stack and a single prism, and wherein the at least one imager comprises first and second imagers, and wherein the single prism directs the light from the single lens stack to the first imager to obtain a first one of the plurality of initial images and wherein the single prism directs the light to the second imager to obtain a second one of the plurality of initial images.

8. The seeker imaging system of claim 1, wherein the plurality of initial images are each at a first resolution, and wherein the plurality of initial images are each offset from one another by a sub-pixel amount.

9. The seeker imaging system of claim 8, wherein the control electronics is configured to execute a super resolution algorithm on the plurality of initial images to generate the single output image having a second resolution greater than the first resolution.

10. The seeker imaging system of claim 9, wherein the control electronics is further configured to perform pixel binning to generate the single output image have a third resolution less than the first resolution.

11. A method of generating a single output image for a seeker, the method comprising:
    receiving light by a plurality of optical elements;
    directing, by the plurality of optical elements, the light to at least one imager;
    outputting, by the at least one imager, image frame data based upon the received light;
    receiving, by control electronics, the image frame data from the at least one imager;
    obtaining, by the control electronics, a plurality of initial images from each frame of the image frame data; and
    generating, by the control electronics, a single output image based upon the plurality of initial images; and
    if a target has not yet been acquired, receiving by an automatic target acquisition block of the control electronics the single output image at a desired resolution of the super resolution algorithm and processing the single output image to identify a location of a desired target in a field of view of the seeker; and,
    if a target is recognized, determining by the target acquisition block a target gate and passing by the target acquisition block the target gate to an automatic target tracker block as an initial target gate for subsequent images from the super resolution algorithm.

12. The method of claim 11, wherein the plurality of optical elements comprises a plurality of lens stacks, and wherein the at least one imager comprises a focal plane array.

13. The method of claim 12, wherein directing, by the plurality of optical elements, the light to at least one imager comprises:
    directing, by a first lens stack, the light to a first quadrant of the focal plane array;
    directing, by a second lens stack, the light to a second quadrant of the focal plane array;
    directing, by a third lens stack, the light to a third quadrant of the focal plane array; and
    directing, by a fourth lens stack, the light to a fourth quadrant of the focal plane array.

14. The method of claim 13, wherein obtaining, by the control electronics, the plurality of initial images from each frame of the image frame data comprises:

obtaining a first initial image from the image frame data corresponding to the first quadrant of the focal plane array;

obtaining a second initial image from the image frame data corresponding to the second quadrant of the focal plane array;

obtaining a third initial image from the image frame data corresponding to the third quadrant of the focal plane array; and obtaining a fourth initial image from the image frame data corresponding to the fourth quadrant of the focal plane array.

15. The method of claim 11, wherein the plurality of optics includes a single lens stack, a plurality of prisms and a plurality of mirrors, and wherein the at least one imager comprises a focal plane array.

16. The method of claim 15, wherein directing, by the plurality of optical elements, the light to at least one imager comprises:

splitting, by the plurality of prisms, the light from the single lens stack; and directing, by the plurality of prisms and the plurality of mirrors, the light to the focal plane array, wherein the light is split to form the plurality of initial images.

17. The method of claim 11, wherein the plurality of optics includes a single lens stack and a single prism, and wherein the at least one imager comprises first and second imagers, and wherein directing, by the plurality of optical elements, the light to at least one imager comprises:

directing, by the single prism, the light from the single set of lenses to the first imager to obtain a first one of the plurality of initial images; and directing, by the single prism, the light to the second imager to obtain a second one of the plurality of initial images.

18. The method of claim 11, wherein the plurality of initial images are each at a first resolution, and wherein directing, by the plurality of optical elements, the light to the at least one imager comprises directing the light such that the plurality of initial images are each offset from one another by a sub-pixel amount.

19. The method of claim 18, wherein generating, by the control electronics, the single output image comprises executing, by the control electronics, a super resolution algorithm on the plurality of initial images to generate the single output image having a second resolution greater than the first resolution.

20. The method of claim 19, wherein generating, by the control electronics, the single output image further comprises performing pixel binning to generate the single output image having a third resolution less than the first resolution.

* * * * *